(12) United States Patent
Berthier et al.

(10) Patent No.: US 9,929,754 B2
(45) Date of Patent: Mar. 27, 2018

(54) METHOD AND DEVICE FOR TRANSMITTING A MESSAGE

(71) Applicant: MORPHO, Issy-les-Moulineaux (FR)

(72) Inventors: Mael Berthier, Issy-les-Moulineaux (FR); Yves Bocktaels, Issy-les-Moulineaux (FR); Julien Bringer, Issy-les-Moulineaux (FR); Francois Lecocq, Issy-les-Moulineaux (FR)

(73) Assignee: MORPHO, Issy-les-Moulineaux (FR)

( * ) Notice: Subject to any disclaimer, the term of this patent is extended or adjusted under 35 U.S.C. 154(b) by 0 days.

(21) Appl. No.: 14/400,070

(22) PCT Filed: May 7, 2013

(86) PCT No.: PCT/EP2013/059519
§ 371 (c)(1),
(2) Date: Nov. 10, 2014

(87) PCT Pub. No.: WO2013/167608
PCT Pub. Date: Nov. 14, 2013

(65) Prior Publication Data
US 2015/0098519 A1    Apr. 9, 2015

(30) Foreign Application Priority Data
May 11, 2012    (FR) ..................... 12 54329

(51) Int. Cl.
*H04L 27/36* (2006.01)
*H04L 27/38* (2006.01)
(Continued)

(52) U.S. Cl.
CPC ............. *H04B 1/04* (2013.01); *G06K 7/0013* (2013.01); *G06K 7/0034* (2013.01); *H04L 9/00* (2013.01);
(Continued)

(58) Field of Classification Search
USPC .................. 375/219, 220, 222, 221, 240, 375/240.26–240.27, 256, 285, 284, 295,
(Continued)

(56) References Cited

U.S. PATENT DOCUMENTS 6,449,741 B1   9/2002  Organ et al.
6,675,339 B1   1/2004  Lanier et al.
(Continued)

FOREIGN PATENT DOCUMENTS

WO    2010/141661 A1   12/2010
WO    2012/046029 A1    4/2012

OTHER PUBLICATIONS

International Search Report dated Jul. 26, 2013, in PCT/EP2013/059519, filed May 7, 2013.
(Continued)

*Primary Examiner* — Linda Wong
(74) *Attorney, Agent, or Firm* — Oblon, McClelland, Maier & Neustadt, L.L.P.

(57) ABSTRACT

An embedded system and, in particular, a communication protocol suitable for a data transmission using auxiliary physical channels of such an embedded system. A transmission method suitable for such a channel includes the transmission of a data signal based on the encoding of three symbols. The message consists of a preamble allowing recognition of the symbols used, followed by the significant part of the message. The decoding of the message comprises a first step of learning the symbols used, prior to the decoding of the significant part of the message.

7 Claims, 2 Drawing Sheets

(51) Int. Cl.
  *H04B 15/00* (2006.01)
  *H04B 1/04* (2006.01)
  *G06K 7/00* (2006.01)
  *H04L 9/00* (2006.01)
(52) U.S. Cl.
  CPC .............. *H04L 9/002* (2013.01); *H04L 9/003* (2013.01); *H04L 9/004* (2013.01)
(58) Field of Classification Search
  USPC ................. 375/316, 324, 346, 358, 340, 341
  See application file for complete search history.

(56) References Cited

U.S. PATENT DOCUMENTS

| | | | |
|---|---|---|---|
| 7,191,368 B1 | 3/2007 | Organ et al. | |
| 7,336,751 B2* | 2/2008 | Harada et al. | 375/365 |
| 7,979,636 B2* | 7/2011 | Ito | G11C 16/349 711/104 |
| 2009/0097444 A1* | 4/2009 | Lohr et al. | 370/329 |
| 2010/0309039 A1 | 12/2010 | Rivers et al. | |
| 2011/0243269 A1* | 10/2011 | Kogawa et al. | 375/295 |
| 2012/0044762 A1* | 2/2012 | Rotbard | G11C 11/56 365/185.03 |
| 2012/0243636 A1* | 9/2012 | Yamagishi | G06F 13/42 375/295 |
| 2012/0281699 A1* | 11/2012 | Jia et al. | 370/392 |

OTHER PUBLICATIONS

International Search Report dated Jul. 26, 2013, in PCT/EP2013/059519, dated May 7, 2013.

Jude Angelo Ambrose, et al., "A Smart Random Code Injection to Mask Power Analysis Based Side Channel Attacks", 5$^{th}$ IEEE/ACM/IFIP International Conference on Hardware/Software Codesign and System Synthesis (CODES+ISSS), XP 031943143, Sep. 30, 2007, pp. 51-56.

Soumendu Bhattacharya, et al., "A DFT Approach for Testing Embedded Systems Using DC Sensors", IEEE Design & Test of Computers, vol. 23, No. 6, XP 011152810, Nov.-Dec. 2006, pp. 464-475.

* cited by examiner

METHOD AND DEVICE FOR TRANSMITTING A MESSAGE

The present invention concerns the field of embedded systems and more particularly a communication protocol suitable for a data transmission using auxiliary physical channels of such an embedded system.

Chip cards have a so-called "end of life" state where it is in theory no longer possible to use the card. The card is in this state following an abnormality or an attack. The card blocks itself and refuses any functioning in order to preserve the integrity of the sensitive data that it contains and to ensure that they are not stolen.

Nevertheless it would be advantageous to be able to know the problem causing the card to go into this end-of-life state.

However, since the card is blocked, it is not possible to communicate with it. In addition, since the cause of the blocking of a card may be an attack it is important not to compromise the sensitive data potentially contained in the card.

It is possible to use a method for the transmission of data by a chip card at the end of life using hidden communication channels different from the standard communication channels of the card. These channels are activated by the modulation of a digital signal through the modification of a hardware parameter of the card.

In this way the card has a means for transmitting state information through a strictly monodirectional channel, typically asynchronous, which in no way lessens the security of the card.

However, these communication channels are very special and, in particular variable. Since the end-of-life state may be due, among other possible reasons, to hardware malfunctionings, it is never possible to foretell with certainty the particular form that the modification of the hardware parameter of the card may take.

The invention aims to solve this problem by proposing a transmission method suited to such a channel. This method comprises the transmission of a data signal based on the encoding of three symbols. The message is composed of a preamble for recognising the symbols used, followed by the significant part of the message. The decoding of the message comprises a first step of learning the symbols used, prior to the decoding of the significant part of the message.

In this way, it is possible to decode the message transmitted, even in the case where the message is deformed by a hardware malfunctioning affecting the physical characteristic used as a communication channel.

The invention concerns a method for transmitting a message in the form of a detectable and controlled change in a hardware characteristic of an information processing device that comprises the following steps:
  the transmission of a preamble consisting of an alternating succession of symbols encoding the binary values "0" and "1" followed by a separating symbol;
  the transmission of a significant part consisting of a succession of symbols "0" and "1" optionally separated by the separating symbol "2".

According to a particular embodiment of the invention, it also comprises a step of prior transmission of a start-of-sequence marker in the form of a symbol different from the symbols used for encoding the message.

According to a particular embodiment of the invention, it also comprises a subsequent step of transmitting an end-of-sequence marker in the form of a symbol different from the symbols serving to encode the message.

According to a particular embodiment of the invention, the transmission steps are repeated regularly.

According to a particular embodiment of the invention, it comprises:
  a step of learning the symbols on capture of the signal transmitted;
  a step of decoding the significant part of the message using the symbols learned.

According to a particular embodiment of the invention, it also comprises:
  a prior phase of synchronisation on a capture of the signal transmitted by locating at least one start- or end-of-sequence marker.

According to a particular embodiment of the invention it also comprises a step of correlation and addition of several copies of the signal, the latter having been transmitted repeatedly.

The invention also concerns an information processing device that comprises:
  means for transmitting a message in the form of a detectable and controlled change in a hardware characteristic of said information processing device;
  means for transmitting a preamble consisting of an alternating succession of symbols coding the binary values "0" and "1" followed by a separating symbol;
  means for transmitting a significant part consisting of a succession of symbols "0" and "1" optionally separated by the separating symbol "2".

The invention also concerns a chip card that comprises:
  means for transmitting a message in the form of a detectable and controlled change in a hardware characteristic of said information processing device;
  means for transmitting a preamble consisting of an alternating succession of symbols coding the binary values "0" and "1" followed by a separating symbol;
  means for transmitting a significant part consisting of a succession of symbols "0" and "1" always separated by the separating symbol "2".

The features of the invention mentioned above, as well as others, will emerge more clearly from a reading of the following description of an example embodiment, said description being given in relation to the accompanying drawings, among which:

Figure 1:
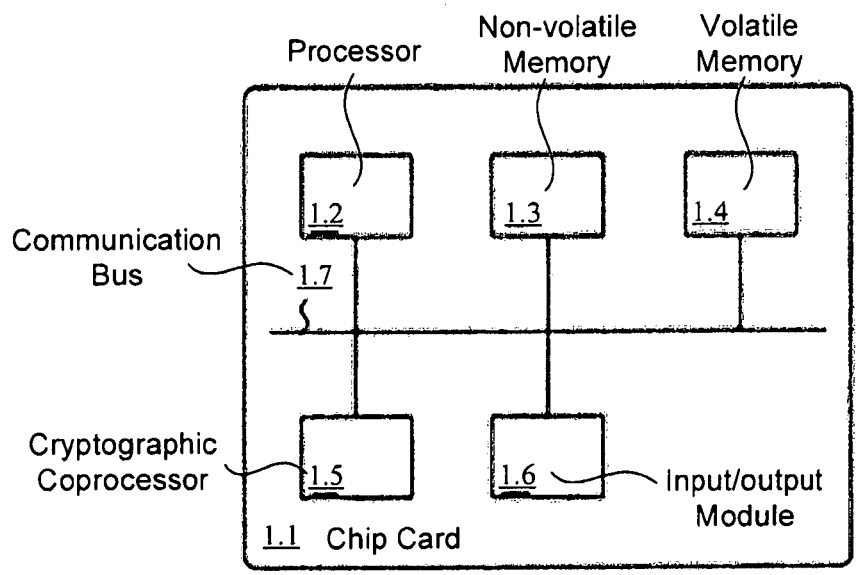
FIG. 1 illustrates the architecture of a chip card according to an example embodiment of the invention.

FIG. 1 illustrates the typical architecture of a chip card 1.1. It comprises a processor 1.2 for executing programs situated in non-volatile memory 1.3. These non-volatile memories enable data to be stored and recorded. These memories may be programmable, such as the EEPROM (Electrically-Erasable Programmable Read-Only Memory) and Flash memory. They may also not be, such as the ROM (Read Only Memory). The data that are to be manipulated by these programs are also typically situated in a non-volatile memory 1.3. To be executed, these programs use a volatile memory or random access memory 1.4 as a working memory. Volatile memories such as the RAM (Random Access Memory) as for them enable to store and modify data, state variables and results of computations during the execution of the software present in the component. Chip cards also typically have a cryptographic coprocessor 1.5 dedicated to the enciphering and deciphering operations. The inputs/outputs take place by means of an input/output module 1.6 that enables the card to communicate with its environment, typically a card reader. The communications between these various modules take place by means of a communication bus 1.7.

A functional card may decide to go to the end of its life for a number of reasons. It may be a case of the detection of an attack or the detection of a fault. The procedure for going to end of life comprises several steps. It is a question of protecting the sensitive data contained in the card. To do this, all the deletable data are deleted. According to the hardware used, it is generally possible to block access to memory pages by blocking address ranges. Typically, all the address ranges that can be are blocked. The inputs/outputs of the cards are also blocked. The card is then marked as being at the end of its life. This marking is typically done by storing a flag in memory. This flag remains accessible to the boot module. It is by this means that the boot module has knowledge of the state of the card.

An auxiliary transmission channel is defined as being a data transmission channel using a controlled modification of a hardware characteristic of a card, this modification being detectable from outside the card.

When the card goes to its end of life, information is then transmitted by an auxiliary transmission channel. This information is typically state information related to the cause for going to end of life. It may be related to the module involved in the detection of a fault. It may also be related to the type of attack detected if the cause of going to end of life is the detection of an attack. It may also be related to any type of information which one wishes to dispose of once the card is at the end of its life. This copying of information is typically the only supplementary operation relating to the invention occurring when the card goes to its end of life.

According to a first embodiment of the invention, the hardware characteristic used for the auxiliary channel is the current consumption of the card. In this embodiment, it is possible to modify by software the clock frequency of functioning of the card processor. It is then possible to use a chosen instruction of the processor that will be called at various clock frequencies for coding binary information. According to the example embodiment, the instruction "NOP" is used. This instruction causes no computation; however, it does cause current consumption dependent on the clock frequency selected. It should be noted that the duration of execution of the instruction also depends on the frequency selected, and therefore also the duration of the coded signal. Advantageously, a state makes it possible to code an intermediate symbol introduced between two value symbols. This permits to easily distinguish two successive symbols of the same value.

According to another embodiment, the hardware characteristic used is the functioning of the cryptographic coprocessor. The symbols are coded in the form of instructions that use, or not, the cryptographic coprocessor. A recording of the electromagnetic transmissions transmitted in the vicinity of this coprocessor makes it possible to recover a signal where information on use of this coprocessor appears.

It is also possible to use the temperature of the card, since certain instructions are known to cause heating of the processor, others less so. It is also possible to use sound or electromagnetic fields.

The principle is that the information is coded in the form of a detectable and controlled change of a hardware characteristic of the card.

It would have been possible to use the physical communication interfaces of the card but this would have required implementing a complete communication driver in the second system. However, the solution adopted can advantageously be implemented by means of just a few lines of codes. It suffices to have a loop reading the data to be transmitted and coding them in the form of a series of instructions for modifying the chosen physical characteristic. As the memory space in a chip card is limited, this restraint is advantageous.

It should also be noted that, since the end of life may be caused by a fault in the card, the more limited the resources used to implement the second system are, the more increasing the chances that it is operational are.

The communication channel thus created is strictly monodirectional. This characteristic is important from a security point of view. It is not possible for an attacker to use this channel to write a data item in the card or to attempt to cause an undesired behaviour thereof.

The channel is also highly variable because a malfunctioning may interfere with the functioning of the card and impair the modifications to the physical characteristic used by the auxiliary transmission channel. For example, the use of the modification of the current consumption may be impaired by the malfunctioning of a hardware module that may cause increased or decreased current consumption. The thresholds and the levels of the symbols transmitted will then be different from those expected for a card in a good state of functioning. Since possible malfunctionings are numerous, it is advantageous not to use a priori knowledge on the form of the symbols coded.

Three different symbols are therefore advantageously used. A first symbol codes the binary value "1", a second symbol codes the binary value "0", while the third symbol serves as a separator. Actually, according to the channel used, the length of the symbols may vary and it may also possibly be modified by a malfunctioning of the card. Typically, if the symbols are coded by a modification of the clock frequency of the processor when an "NOP" instruction is executed, the duration of the execution varies according to the clock frequency. It is therefore possible that the duration of the symbol "0" and that of the symbol "1" may be different. The use of a separation symbol therefore permits to differentiate several successive occurrences of the same symbol.

Figure 2:
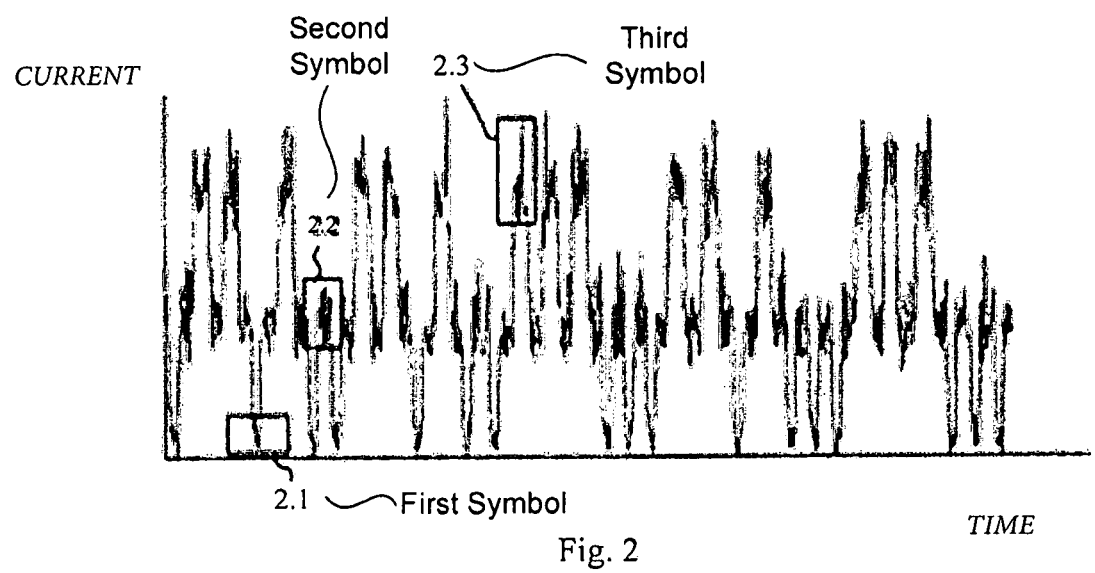
FIG. 2 illustrates an example of a signal according to the invention.

FIG. 2 illustrates an example of a signal in a case where the channel uses the current consumption. The signal illustrated is an extract of a capture on an oscilloscope of the change over time in the current consumption. The three symbols used can be seen very clearly. A first symbol 2.1 codes the value "0", a second symbol 2.2 serves as a separator and the third symbol 2.3 codes the value "1". It can be seen that each symbol is coded by a plateau, that is to say the signal remains around an average target value for a certain length of time without varying greatly. A first plateau can be seen in the figure around a low consumption value, the plateau 2.1, a second plateau around an average value, the plateau 2.2, and a third plateau around a high consumption value 2.3.

Even if the average values of each plateau, the duration of the plateau or the standard deviation of the values measured during the plateau are affected by a malfunctioning of the card, it is generally always possible to distinguish the various symbols. These symbols may then be learnt without any a priori knowledge on their form.

According to an example embodiment, the learning is done by means of a step of manually selecting the patterns.

The start and end of each of the three, or more, patterns is delimited on the displayed curve. Several characteristics of these extracts are adopted in order to bring out a distinctive element of the patterns. These characteristics may comprise the average, the standard deviation, the correlation or others.

Figure 3:
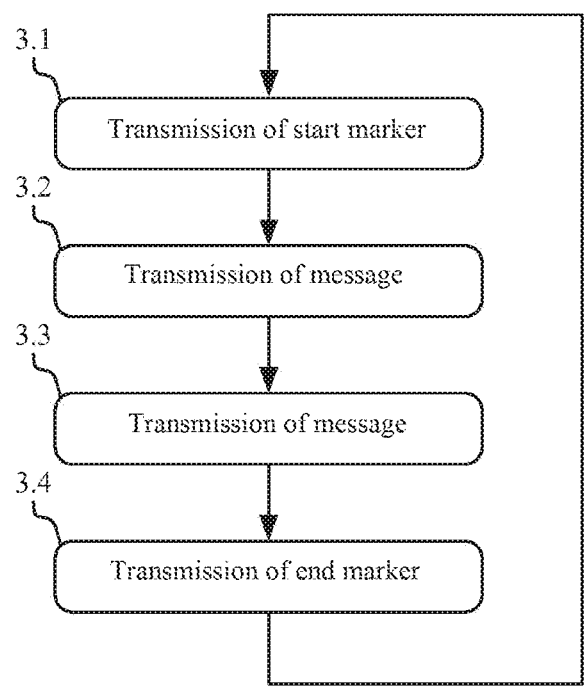
FIG. 3 illustrates the flow diagram of the transmission method according to an embodiment of the invention.

FIG. 3 illustrates the method of transmitting a message according to an embodiment of the invention.

During an optional step 3.1, a start-of-sequence marker is transmitted. This marker may advantageously consist of a fourth symbol different from the symbols "0", "1" and the separating symbol. When it is present, this symbol marking the start of the sequence synchronises the decoding and facilitates the recognition of the preamble. When it is absent, step 3.2 is directly passed to.

During a step 3.2, the card transmits the preamble. Advantageously, the preamble consists of a succession of alternating symbols "0" and "1" not separated by a separating symbol. This succession terminates in an occurrence of the separating symbol. For example, the sequence transmitted in an example embodiment of the invention is the following sequence: 0, 1, 0, 1, 2, where the value "2" represents the separating symbol. This way of proceeding enables to distinguish the preamble from the significant part of the message. Actually, in the significant part of the message, the symbols "0" and "1" are always separated by the separating symbol "2". Alternatively, the separating symbol may be inserted only between two identical successive symbols. The preamble is then clearly recognisable compared with the message itself. As it contains a known sequence of symbols, it is possible to recognise them and to learn their form.

During a step 3.3, the significant part is transmitted. This significant part consists of a succession of symbols "0" and "1" optionally separated by the separating symbol "2".

During an optional step 3.4, an end-of-sequence marker is transmitted. This marker may advantageously consist of a fifth symbol, but it is also possible to adopt the fourth symbol used as a start-of-sequence marker when the two markers are used. When it is present, this symbol marking the end of the sequence synchronises the decoding in the case where the transmission of the message takes place repetitively. When it is not present, the use alone of a start of sequence marker may enables to separate the various copies of the message.

Advantageously, although not necessarily, the message, its preamble and any start- and/or end-of-sequence markers are regularly transmitted. This transmission permits to increase the acquisitions of the same message, an improvement in the signal to noise ratio then being able to be effected by correlation and addition of the various captures, the noise having a tendency to cancel itself out while the signal is reinforced. This is one of the advantages of a deferred processing of the captures delivered from the real-time constraints.

Figure 4:
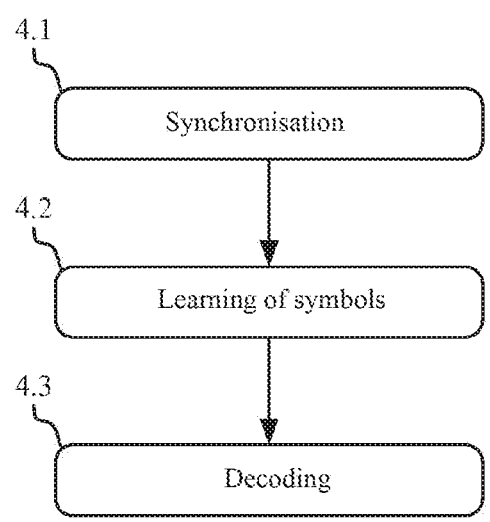
FIG. 4 illustrates the flow diagram of the decoding method according to an embodiment of the invention.

FIG. 4 illustrates the corresponding decoding method according to an example embodiment of the invention.

During an optional first step 4.1, a synchronisation on a capture of the transmitted signal is effected. The capture is done advantageously by recording the complete frame on an oscilloscope. This step consists of locating the start- and/or end-of-sequence markers if they are present so as to fix the capture timewise. This facilitates the recognition of the rest of the message.

During a step 4.2, the symbols are learned on a capture of the transmitted signal. This learning is effected on the preamble. It is therefore sought to detect the alternating succession of signal levels that may correspond to the succession of sought symbols "0" and "1". Next the following separating symbol is learned. Advantageously, if the signal is transmitted several times, an optional step of correlation and addition of the copies of the signal is performed in order to improve the signal to noise ratio.

During a step 4.3, once the symbols have been determined, it is possible to decode the significant part of the decoding by means of the learned symbols.

The example embodiment of the invention is done on an electrical consumption signal, but any type of physical hardware characteristic may be used. It gives rise to a capture of the change over time in the measurement of this hardware characteristic and is therefore processed in a similar manner to that described here for an electrical consumption level.

The invention, although described in the context of a chip card, can apply to any information processing device transmitting a message in the form of a detectable and controlled change in a hardware characteristic of said device.

The invention claimed is:

1. A method for transmission, by a smart card, of a message, the method comprising:
   detecting, by the smart card, an end-of-life state of the smart card;
   selecting, by the smart card and based on the detected end-of-life state, a predetermined monodirectional communication channel;
   transmitting, by the smart card, the message using the predetermined monodirectional channel, the transmitting of the message including
      transmitting a start-of-sequence marker in a form of a symbol, before transmitting a preamble,
      transmitting the preamble consisting of an alternating succession of symbols coding the binary values "0" and "1" followed by a separating symbol "2",
      transmitting a part, said part forming a content of said message and consisting of a succession of symbols coding the binary values "0" and "1" separated by the separating symbol "2", and
      transmitting an end-of-sequence marker, transmitted after transmission of the part, in a form of a symbol different from the symbols used for coding the preamble or the content of the message,
   the transmitted message including status information related to a cause of the detected end-of-life state of the smart card, the cause relating to a change in a hardware characteristic of the smart card.

2. The method according to claim 1, further comprising:
   transmitting a symbol by executing a selected instruction, the selected instruction being embedded in a non-transitory computer readable medium and executed by a processor of said smart card, said hardware characteristic used by the predetermined monodirectional communication channel being a current consumed by said smart card, or a temperature of said smart card, or a sound and/or electrical fields emitted by said smart card while the processor executes said selected instruction.

3. The method according to claim 1, wherein the transmission steps are regularly repeated.

4. A method for decoding a message transmitted by a smart card using at least one physical hidden communication channel in a form of a detectable controlled change in a hardware characteristic of said smart card, the method comprising:
   transmitting a preamble consisting of an alternating succession of symbols coding the binary values "0" and "1" followed by a separating symbol "2";

transmitting a part, said part forming a content of said message and consisting of a succession of symbols coding the binary values "0" and "1" separated by the separating symbol "2", said transmitting of the preamble and said transmitting of the part being performed as said smart card is in an end-of-life state, said message including status information related to a cause of the card to go into said end-of-life state;

correlating and adding several copies of the transmitted message, the message having been repeatedly transmitted;

detecting an alternating succession of controlled change in the hardware characteristic of said smart card corresponding to the transmission of the preamble;

learning the controlled change in the hardware characteristic of said smart card corresponding to the symbols of the preamble and the part forming the content of the message; and decoding the content of the message using the learnt symbols.

5. The method according to claim 4, further comprising: synchronizing, prior to the learning of the controlled change in the hardware characteristic of said smart card, a capture of the transmitted message by locating at least one start- or end-of-sequence marker.

6. A smart card to transmit a message, the said smart card comprising:
    circuitry configured to
        detect an end-of-life state of the smart card,
        select, based on the detected end-of-life state, a predetermined monodirectional communication channel,
        transmit the message using the predetermined monodirectional channel, wherein transmitting the message includes
            transmit a start-of-sequence marker in a form of a symbol, before transmitting a preamble,
            transmit the preamble consisting of an alternating succession of symbols coding the binary values "0" and "1" followed by a separating symbol, and
            transmit a part forming a content of said message and consisting of a succession of symbols coding the binary values "0" and "1" separated by the separating symbol "2", and
            transmit an end-of-sequence marker, transmitted after transmission of the part, in a form of a symbol different from the symbols used for coding the preamble or the content of the message,
        wherein the transmitted message including status information related to a cause of the detected end-of-life state of the smart card, the cause relating to a change in a hardware characteristic of the smart card.

7. The smart card according to claim 6, wherein the hardware characteristic used by the predetermined monodirectional communication channel is a current consumed by said smart card, a temperature of said smart card, a sound, and electrical fields emitted by said smart card while the circuitry executes a selected instruction.

* * * * *